US009605905B2

United States Patent
Haglid

(10) Patent No.: US 9,605,905 B2
(45) Date of Patent: Mar. 28, 2017

(54) AIR-TO-AIR COUNTER-FLOW HEAT EXCHANGER

(76) Inventor: Klas C. Haglid, Ridgewood, NJ (US)

( * ) Notice: Subject to any disclaimer, the term of this patent is extended or adjusted under 35 U.S.C. 154(b) by 969 days.

(21) Appl. No.: 13/427,563

(22) Filed: Mar. 22, 2012

(65) Prior Publication Data

US 2013/0248154 A1   Sep. 26, 2013
US 2017/0016676 A9   Jan. 19, 2017

Related U.S. Application Data

(62) Division of application No. 11/656,110, filed on Jan. 22, 2007, now Pat. No. 8,162,042.

(51) Int. Cl.

| F28F 11/00 | (2006.01) |
|---|---|
| F28D 9/00 | (2006.01) |
| F28F 17/00 | (2006.01) |
| F24F 13/22 | (2006.01) |
| F24F 12/00 | (2006.01) |

(52) U.S. Cl.
CPC .......... *F28D 9/0081* (2013.01); *F24F 12/006* (2013.01); *F24F 13/222* (2013.01); *F28F 17/005* (2013.01); *Y02B 30/563* (2013.01)

(58) Field of Classification Search
CPC ..... F28D 9/0081; F28F 17/005; F24F 12/006; F24F 13/222
USPC ........................... 165/8, 10, 54, 70, 165, 166
See application file for complete search history.

(56) References Cited

U.S. PATENT DOCUMENTS

| 1,662,870 | A | * | 3/1928 | Stancliffe | 165/166 |
|---|---|---|---|---|---|
| 2,247,542 | A | * | 7/1941 | Anderson | 165/250 |
| 3,912,004 | A | * | 10/1975 | Darm | 165/166 |
| 4,174,987 | A | * | 11/1979 | Belvin et al. | 156/197 |
| 4,293,027 | A | * | 10/1981 | Tepe et al. | 165/250 |
| 4,461,344 | A | * | 7/1984 | Allen et al. | 165/110 |
| 4,616,695 | A | * | 10/1986 | Takahashi et al. | 165/166 |
| 4,653,574 | A | * | 3/1987 | Quinlisk et al. | 165/54 |
| 4,820,468 | A | * | 4/1989 | Hartig | 264/163 |
| 4,841,738 | A | * | 6/1989 | Katsuki et al. | 165/254 |
| 4,858,685 | A | * | 8/1989 | Szucs et al. | 165/166 |
| 5,024,263 | A | * | 6/1991 | Laine et al. | 165/54 |
| 5,078,208 | A | * | 1/1992 | Urch | 165/166 |
| 5,123,595 | A | * | 6/1992 | Doss | 165/54 |
| 5,193,610 | A | * | 3/1993 | Morissette et al. | 165/54 |
| 5,195,240 | A | * | 3/1993 | Shuster et al. | 29/890.039 |
| 5,239,834 | A | * | 8/1993 | Travers | 165/54 |
| 5,259,203 | A | * | 11/1993 | Engel et al. | 62/150 |
| 5,348,077 | A | * | 9/1994 | Hillman | 165/59 |
| 5,431,215 | A | * | 7/1995 | Davis | 165/54 |
| 5,474,639 | A | * | 12/1995 | Alander et al. | 165/166 |
| 5,497,823 | A | * | 3/1996 | Davis | 165/54 |
| 5,927,387 | A | * | 7/1999 | Nystrom | 165/54 |
| 6,176,305 | B1 | * | 1/2001 | Haglid | 165/54 |
| 6,289,974 | B1 | * | 9/2001 | DeGregoria et al. | 165/54 |
| 6,983,788 | B2 | * | 1/2006 | Haglid | 165/165 |
| 7,231,967 | B2 | * | 6/2007 | Haglid | 165/54 |

(Continued)

*Primary Examiner* — Ljiljana Ciric
(74) *Attorney, Agent, or Firm* — Gregor N. Neff

(57) ABSTRACT

The heat exchanger includes a plastic multi-tube panel core and a solid plastic housing, with opposed-flow heat exchange and inlet-outlet extensions from only one side of the core. The multi-tube panels are spaced from one another by spacers positioned along the length of the panels. The spacers guide intake air in one direction along a sinuous path in the spaces between the panels, while exhaust air flows in the opposite direction through the tubes in the panels.

8 Claims, 3 Drawing Sheets

(56) References Cited

U.S. PATENT DOCUMENTS

| | | | |
|---|---|---|---|
| 7,334,629 B2* | 2/2008 | Haglid | 165/54 |
| 7,497,247 B2* | 3/2009 | Haglid | 165/54 |
| 7,640,662 B2* | 1/2010 | Haglid | 29/890.03 |
| 8,162,042 B2* | 4/2012 | Haglid | 165/165 |
| 2001/0032714 A1* | 10/2001 | Haglid | 165/54 |
| 2002/0153133 A1* | 10/2002 | Haglid | 165/54 |
| 2002/0164944 A1* | 11/2002 | Haglid | 454/228 |
| 2005/0236151 A1* | 10/2005 | Haglid | 165/231 |
| 2006/0124277 A1* | 6/2006 | Haglid | 165/54 |
| 2006/0137854 A1* | 6/2006 | Haglid | 165/54 |
| 2006/0151149 A1* | 7/2006 | Haglid | 165/54 |
| 2008/0000630 A1* | 1/2008 | Haglid | 165/287 |
| 2008/0003940 A1* | 1/2008 | Haglid | 454/228 |
| 2008/0173433 A1* | 7/2008 | Haglid | 165/165 |
| 2008/0173438 A1* | 7/2008 | Haglid | 165/65 |

\* cited by examiner

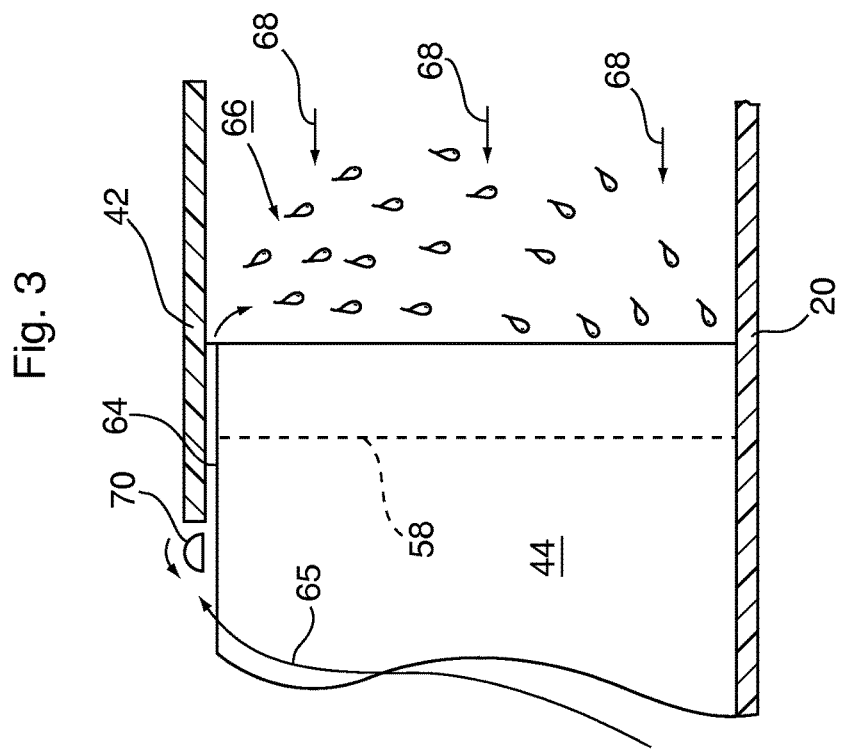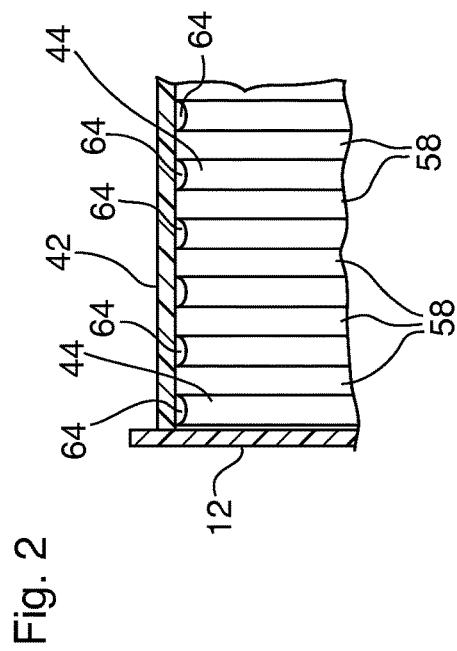

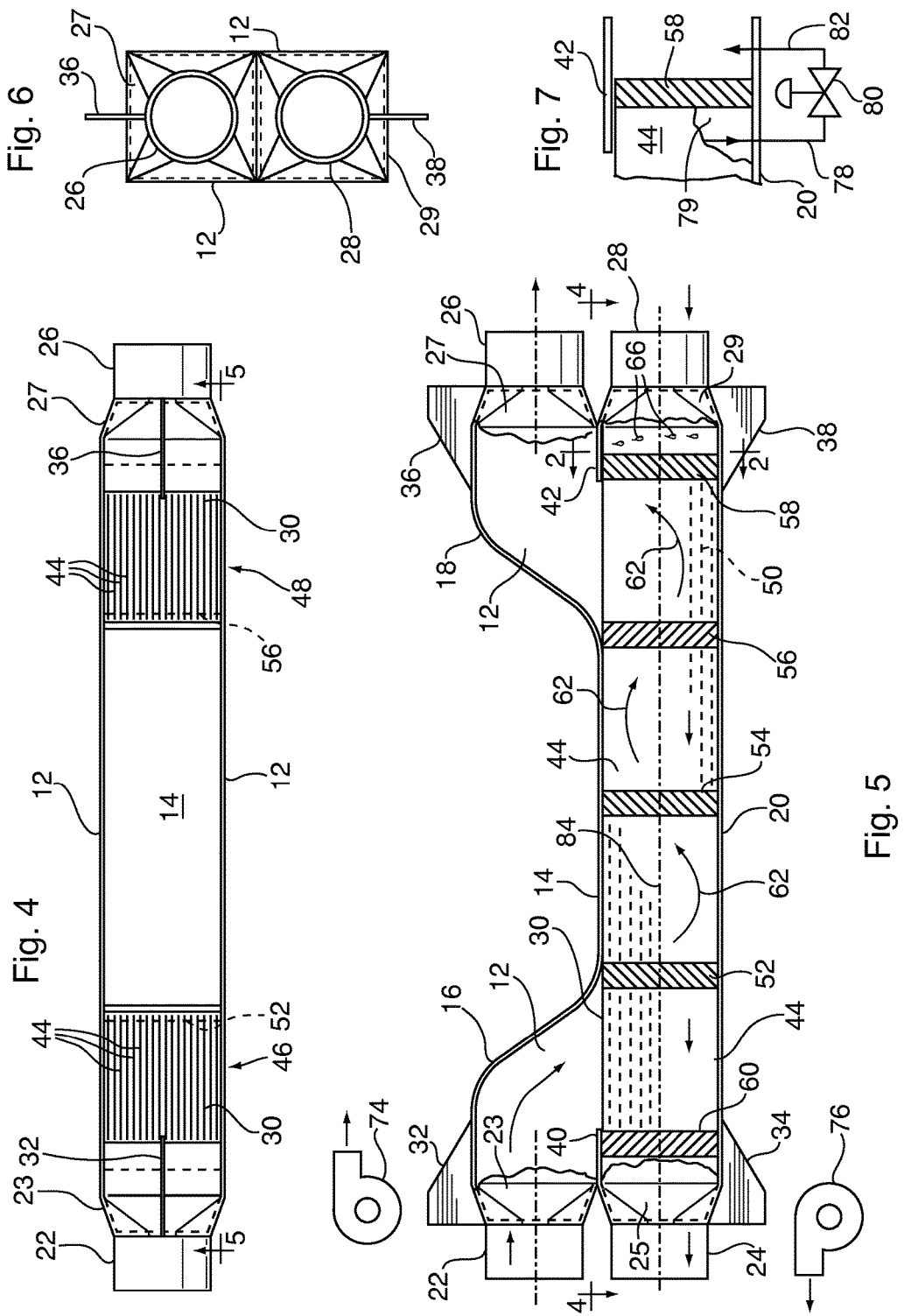

AIR-TO-AIR COUNTER-FLOW HEAT EXCHANGER

This invention relates to energy recovery ventilation and particularly to heat exchanger structures And methods for use in such ventilation. This patent application is a division of U.S. patent application Ser. No. 11/656,110, filed Jan. 22, 2007, now U.S. Pat. No. 8,162,042.

U.S. Pat. No. 6,983,788 shows a particularly beneficial energy recovery device and method for energy recovery ventilation and for manufacturing heat exchangers and ventilation systems for such purpose.

It is an object of this invention to provide improvements for such ventilation and heat exchanger systems and methods.

In particular, it is an object to provide such a ventilation system, heat exchanger and method in which the effectiveness, and particularly the latent effectiveness, is significantly improved.

Another object of the invention is to provide a heat exchanger structure which is particularly easy to install, robust and long-lasting.

A further object is to provide such a system, method and heat exchanger which can perform well in even the most demanding hot and humid climactic conditions.

A further object is to provide a relatively simple structure which is relatively less costly to manufacture.

In accordance with the present invention, the foregoing objects are met by the provision of an energy recovery heat exchanger in which the condensate that often forms in the incoming outside air flow passages is delivered to the exhaust flow passages of the heat exchanger, preferably at the inlet ends of those passages. This is believed to significantly increase the latent effectiveness of the heat exchanger. It is believed that this is because the condensate evaporates in the exhaust air and performs evaporative cooling to extract more water from the incoming air.

This has multiple benefits. First, more water is removed from the incoming air, thus requiring considerably less energy use in the refrigeration systems which may be used to remove further water content from the incoming air and create a comfortable level of humidity in the building.

Secondly, because the condensate is evaporated and/or caught up in the exhaust air stream, there need not be a drain connection to the ventilator to drain the liquid condensate off. This saves considerably in manufacturing cost, installation time and expense, and in reducing a possible source of maintenance problems.

The objects of the invention also are satisfied by the provision of a plastic housing which forms four inlet/outlet fittings, all aligned parallel to one another so as to facilitate connecting ductwork to the heat exchanger unit. Furthermore, two extensions from the sides of the housing, at opposite ends of the housing, are provided for the inlet and outlet of either the exhaust or outside air paths. This reduces material and manufacturing costs when the outside housing for the heat exchanger is formed primarily of plastic plates welded together and to the core of the heat exchanger.

This feature also has the advantage of permitting the inlet and outlet for the incoming air to be located vertically above the inlets and outlets for the exhaust air, so that the feed of condensate from the outside air conduits to the exhaust conduits is aided by gravity.

Preferably, a positive-pressure air mover is used to push air through the outside air flow passages, and a negative pressure air mover is used to pull the exhaust air through the heat exchanger. This makes isolation of the air flows more secure, in that, if there are any leaks between the outside air and exhaust flow passages, the flow always will be from the outside air into the exhaust air so that there is no contamination of the incoming air.

This positive pressure feature is used for a beneficial purpose in one embodiment of the invention, in which a restricted leakage path is provided near the outlet end of the outside air passages at a location where condensate will be forced through the path into the inlet ends of the exhaust flow passages so as to simply and automatically provide for condensate feedback to promote enhanced performance.

If desired, the feedback of condensate can be stopped and started or otherwise modulated by means of a control knob which turns a rod which rotates into a position to fully or partially close the openings at the leak location.

Alternatively, a pump can be used to selectively pump the condensate from a collection point in the outside air flow passages to the inlets of the exhaust air passages so as to provide full control of the function. Thus, the function can be turned off completely, turned on completely, or operated at intermediate levels between those two.

As another alternative, a solenoid valve can be connected between a condensate collection point and the inlets to the exhaust flow passages to either allow the positive air pressure to feed the condensate, or to stop such flow.

The foregoing and other objects and advantages will be set forth in or apparent from the following description and drawings.

IN THE DRAWINGS

FIG. 2 is a cross-sectional view, taken along line 2-2 of FIGS. 1 and 5, showing the condensate feedback feature of the invention;

FIG. 3 is a side elevation view, partially cross-sectional and partially schematic, taken along line 3-3 of FIG. 1, illustrating the operation of the condensate feedback feature of the invention;

FIG. 4 is a top plan cross-sectional view taken along line 4-4 of FIG. 5;

FIG. 5 is a partly cross-sectional, side elevation view of the heat exchanger, taken along line 5-5 of FIG. 4;

FIG. 6 is a right end elevation view of the heat exchanger shown in FIGS. 1,4 and 5; and FIG. 7 is a schematic view of alternative embodiments of the invention.

GENERAL DESCRIPTION

Figure 1:
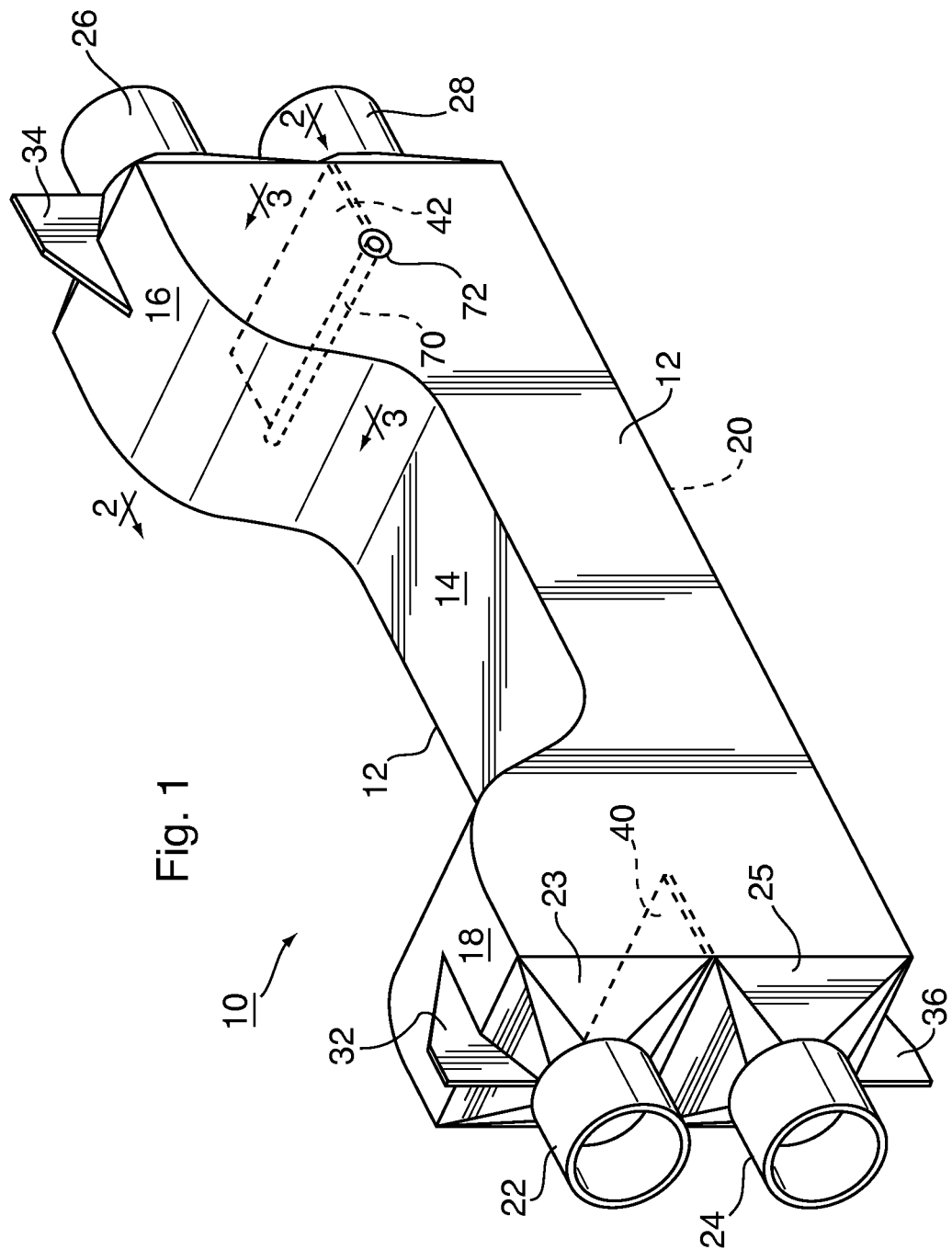
FIG. 1 is a perspective view of a preferred embodiment of a heat exchanger constructed in accordance with the present invention.

FIG. 1 shows a heat exchanger 10 constructed in accordance with the present invention.

The heat exchanger has a housing made of solid plastic material and having two vertical opposed side walls 12, a bottom wall 20, and a top wall 14 with integral raised curved end portions 16 and 18.

Four inlet or outlet fittings 22, 24, 26, and 28 are formed and welded to the walls of the heat exchanger by the use of transition pieces 23, 25, 27, and 29 (also see FIGS. 4 and 5). Advantageously, the longitudinal axis of each of the fittings is parallel to that of the other fittings and to the longitudinal axis of the heat exchanger.

Referring now to FIGS. 4 and 5, inside the housing is a heat exchanger core structure 30, which is a simple elongated rectangular parallelpiped with a square cross-section. Its construction will be described in greater detail below.

Secured to the ends and extending upwardly and downwardly from the outside of the housing are extensions 32, 34, 36, and 38 which can be used advantageously to mount the heat exchanger in, on top of or outside of a building.

As it is shown best in FIG. 5, plates 40 and 42 extend backwardly from the junction of the transition pieces 23 and 25 or 27 and 29, and are welded or otherwise secured between the side walls 12 to separate the flow paths of the outside air entering the building and the exhaust air leaving the building.

Core Structure

Referring now primarily to FIGS. 4 and 5, the core 30 is made up of a plurality of elongated rectangular panels 44 made of plastic material and having integral parallel tubes secured side-by-side to one another. This material is sometimes known as "signboard" material and is described in greater detail in my above-identified patent.

Referring to FIG. 5, the panels 44 are spaced apart from one another by means of spacers 52, 54, 56, 58, and 60 which are welded or otherwise secured between adjacent panels to form air spaces between the panels.

Preferably, the spacers are fairly widely spaced from one another and are formed from strips of the same signboard material as that used for the panels 44. The two end spacers 58 and 60 are aligned with their internal tubular passages extending in the vertical direction, perpendicular to the longitudinal axis 84 of the core. Thus, the end spacers 58 and 60 block the flow of air in a direction parallel to the longitudinal axis.

The remaining spacers 52, 54, and 56 have their internal tubes extending at an angle of approximately 45° to the longitudinal axis 84, with the angle alternating between downwardly and upwardly plus 45° and minus 45° to alternatingly direct the flow of air, as shown in FIG. 5. By this means, air flowing in the spaces between the panels 44 will be directed in a serpentine path indicated by the arrows 62 to effectively lengthen the path and increase the dwell time and turbulence of the air flowing in the spaces so as to increase heat transfer between the air flowing in the spaces and that flowing in the panels 44.

Referring now to FIG. 4 as well as FIG. 5, the upper surface 14 of the housing in the center of the core, and the bottom and side panels 20 and 12 are secured as by welding, adhesive bonding, or other means to the outside of the core. This eliminates "dead" air spaces between the housing and the core.

The housing at 16 and 18 extends outwardly from the core leaving open spaces 46 and 48 (FIG. 4) which provide inlet and outlet openings for the spaces between adjacent panels. Preferably, as already described above, this structure forms inlet and outlet fittings 22 and 26 for conducting outside air into the building.

Air Movers

Referring again to FIG. 5, two air movers or fans 74 and 76 are provided for moving air through the heat exchanger.

The air mover 74 preferably is mounted upstream of the inlet 46 for the outside air, so as to produce a positive pressure in the outside air ducts.

Preferably, the air mover 76 is connected downstream from the outlet of the exhaust passages and produces a negative pressure in the exhaust passages. This has the benefit of insuring that any leakage between the outside air and exhaust passages will result in flow from the outside air into the exhaust air, thus avoiding contamination of the incoming air by the outgoing air.

Condensate Feedback

In accordance with one of the principal features of the invention, means are provided for collecting condensate from incoming outside air and feeding it back into the exhaust air and, ultimately, back into the outside air. This has at least two significant advantages.

First, it appears to significantly improve the effectiveness, and particularly the latent effectiveness, of the heat exchanger. This is believed to be because the condensate which is fed back into the exhaust air causes evaporative cooling of the exhaust air and, therefore, additional cooling of the incoming outside air and additional removal of moisture from that outside air.

Secondly, this feature avoids the need for a drain connection which usually is required to drain off the accumulated condensate. This saves considerably in manufacturing cost for the heat exchanger, and in the installation time and cost. It is believed that it also reduces potential maintenance costs for the drain system.

One method which is used for implementing condensate feedback is illustrated principally in FIGS. 2 and 3.

FIG. 2 is a cross-sectional, broken away view of the plate 42 at the right end of the heat exchanger.

The plate 42 is welded between the side walls 12 and either comes close to or rests upon the upper edges of the spacers 58 and the panels 44 of the core 30.

The cutting of the upper edges of the panels 44 tends to leave recesses 64 along the upper edges of the panels. Unless these recesses are sealed, the structure shown in FIGS. 2 and 3 provides multiple leakage paths for a small amount of air to pass from the downstream ends of the outside air conduits to the inlet ends of the exhaust passages.

The liquid condensate is believed to be forced by the positive air pressure in the outside air ducts to move relatively rapidly through the passageways 64 and form droplets 66 (FIG. 3) which then are forced into the exhaust passages in the panels 44 by the movement of the exhaust air in the direction indicated by arrows 68 in FIG. 3. The condensate then is fully or partially evaporated and issues from the outlet end of the exhaust tubes in the form of water vapor and/or droplets.

Modulating Condensate Flow

The flow of condensate can be controlled in any of several different ways.

First, the spacing between the upper edges of the panels 44 and the plate 42 can be varied to either increase or decrease the air and liquid flow.

It is believed that the air leakage usually will be less than one percent of total outside air flow. This does not significantly reduce the outside air entering the building.

Alternatively, referring to FIG. 1, an elongated half-round rod 70 rotatably mounted in opposite sides 12 of the housing and provided with a knob 72 on the outside of the housing is mounted near the left edge of the plate 42, as it is shown in FIG. 3. The rod 70 is coated with a thick resilient coating (e.g., silicone rubber) which, when the rod 70 is turned, deforms and engages the upper edges of the panels 44 and fills the channels 64 to close the leakage paths and prevent condensate flow. This might be done, for example, in order to insure a higher moisture content for incoming air, when this is needed or desired.

It should be understood that the rod 70 can be rotated to intermediate positions between fully open and fully closed so as to correspondingly modulate the flow through the leakage paths.

A further modulation method is illustrated schematically in FIG. 7. Condensate is collected in an open area 79 at the bottom right hand corner of the panels 44 as shown. The plate 42 is tightly sealed at the top edges of the panels 44 to prevent leakage.

Reference numeral 80 indicates an electrically operated pump or a solenoid-operated valve. When the valve is opened, condensate flows through the line 78 from the collection area 79 and is delivered to the input ends of the panels 44, under the positive pressure provided by the air mover 74 and the negative pressure from the air mover 76.

In the situation where that pressure might not be sufficient, or for the most precise control, a pump 80 can be turned on to pump the condensate. The pump can have a variable flow rate. Both the valve and the pump have the advantage that they can be remotely activated.

A particular advantage of the heat exchanger 10 is that very little or no de-icing is required for the heat exchanger during cold weather. This is believed to be, in part, because relatively high flow velocities can be used in exhausting the exhaust air during both summer and winter, without significantly reducing the energy-recovering heat transfer between the incoming and outgoing air.

Alternatives

Although the heat exchanger construction described above is highly advantageous for use in performing condensate feedback, it should be understood that the invention can be used with many other types of heat exchangers. For example, condensate feedback also can be used with ordinary metal or plastic-tube cubes used as heat exchangers, where the flow passages are mostly perpendicular to one another, as shown in U.S. Pat. No. 6,176,305.

Although the housing shown is formed of solid plastic panels welded together and to the outside surfaces of the core, the housing also can be formed by melting the external edges of the core, as described in the above-identified U.S. Pat. No. 6,983,788.

It also should be understood that the flow passages designated for carrying outside air or exhaust air can be changed to carry the other type of air, if needed or desired.

The above description of the invention is intended to be illustrative and not limiting. Various changes or modifications in the embodiments described may occur to those skilled in the art. These can be made without departing from the spirit or scope of the invention.

What is claimed is:

1. An air-to-air heat exchanger having
   a core made of elongated parallel plastic panels composed of individual tubes secured together side-by-side with one another, and spacers secured at intervals spaced from one another along the lengths of said panels and secured to adjacent ones of said panels to space said panels apart to form spaces between said panels and secure said panels together to form a unitary core structure,
   a housing having walls secured to and enclosing said core,
   said housing having a first inlet opening at one end of said core and a first outlet opening at the opposite end of said core, each of said first inlet and outlet openings communicating with said tubes in said panels,
   said housing having a second inlet opening at said opposite end of said core and a second outlet opening for communicating with said spaces between said panels,
   and a structure for substantially blocking the flow of air between said tubes and said spaces.

2. The air-to-air heat exchanger as in claim 1 in which said housing has walls forming extensions in which said second inlet and outlet openings are formed to facilitate the connection of ductwork to said extensions, and in which both said extensions extend from the same side of said housing.

3. The air-to-air heat exchanger as in claim 2 in which said housing forms first, second, third and fourth ductwork fittings, one for each of said inlet and outlet openings, each of said fittings extending parallel to the fitting next to it at one end of said housing.

4. The air-to-air heat exchanger as in claim 1 including
   an outside air mover for forcing outside air through said spaces between said panels under positive pressure,
   an exhaust air mover for drawing air from inside a building through said tubes, said housing forming at least one leakage path between the conduits for said outside and exhaust air to permit condensation from said outside air to be transported from the outside air conduit to the exhaust conduit.

5. The air-to-air heat exchanger as in claim 4 in which said leakage path is located adjacent the inlet end of said tubes forming said exhaust air conduit.

6. The air-to-air heat exchanger as in claim 1 in which said spacers include two flow spacers at opposite ends of said core to block the flow of air longitudinally in said spaces, and other spacers each having multiple flow passageways directed at an angle to the longitudinal axis of said core, the angle changing from one spacer to the next to effectively lengthen the flow path for air flowing through said spaces.

7. The air-to-air heat exchanger as in claim 1 including mounting members extending outwardly from said housing at opposite ends of said housing.

8. The air-to-air heat exchanger as in claim 1 in which said housing is made of solid plastic surfaces formed by a plurality of plates welded together or by fusing the edges of said panels together.

* * * * *